(12) United States Patent
Gandolph et al.

(10) Patent No.: US 9,595,293 B2
(45) Date of Patent: *Mar. 14, 2017

(54) METHOD AND APPARATUS FOR COMPOSITION OF SUBTITLES

(71) Applicant: THOMSON LICENSING, Issy les Moulineaux (FR)

(72) Inventors: Dirk Gandolph, Ronnenberg (DE); Jobst Hoerentrop, Wenningsen (DE); Ralf Ostermann, Hannover (DE); Hartmut Peters, Barsinsinghausen (DE); Harald Schiller, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,928

(22) Filed: Mar. 6, 2014

(65) Prior Publication Data

US 2015/0255120 A1 Sep. 10, 2015
US 2016/0211000 A9 Jul. 21, 2016

Related U.S. Application Data

(63) Continuation of application No. 12/800,418, filed on May 14, 2010, now Pat. No. 8,737,810, which is a (Continued)

(30) Foreign Application Priority Data

Nov. 15, 2002 (EP) .................................. 02025474

(51) Int. Cl.
*H04N 5/278* (2006.01)
*G11B 27/036* (2006.01)
(Continued)

(52) U.S. Cl.
CPC ............ *G11B 27/036* (2013.01); *G11B 27/19* (2013.01); *H04N 5/278* (2013.01);
(Continued)

(58) Field of Classification Search
CPC .. H04N 21/4884; H04N 5/278; H04N 7/0882; G11B 27/034
(Continued)

(56) References Cited

U.S. PATENT DOCUMENTS 3,891,792 A * 6/1975 Kimura ................... G09G 5/346
315/367
4,706,075 A * 11/1987 Hattori ................... H04N 5/272
345/23
(Continued)

FOREIGN PATENT DOCUMENTS

DE 1094670 A2 * 4/2001 ......... G11B 27/3027
JP 64080181 * 3/1989
(Continued)

OTHER PUBLICATIONS

Bloom et al. "Watermarking to Track Motion Picture Theft", Sarnoff corp., Jan. 4, 2004, IEEE, pp. 363-367.*
(Continued)

*Primary Examiner* — Thai Tran
*Assistant Examiner* — Stephen Smith
(74) *Attorney, Agent, or Firm* — Brian J. Dorini; Reitseng Lin

(57) ABSTRACT

Embodiments of the invention include a subtitling format encompassing elements of enhanced syntax and semantic to provide improved animation capabilities. The disclosed elements improve subtitle performance without stressing the available subtitle bitrate. This will become essential for authoring content of high-end HDTV subtitles in pre-recorded format, which can be broadcast or stored on high (Continued)

Figure 5:
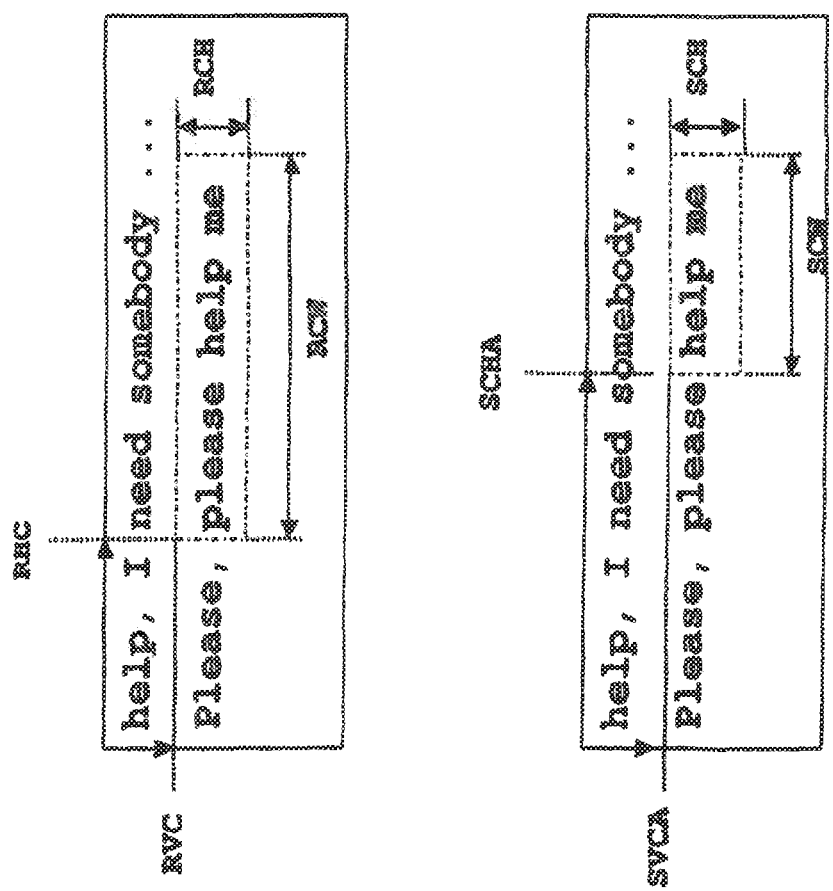

capacity optical media, e.g. the Blue-ray Disc. Embodiments of the invention include abilities for improved authoring possibilities for the content production to animate subtitles. For subtitles that are separate from AV material, a method includes using one or more superimposed subtitle layers, and displaying only a selected part of the transferred subtitles at a time. Further, colors of a selected part of the displayed subtitles may be modified, e.g. highlighted.

1 Claim, 9 Drawing Sheets

Related U.S. Application Data continuation-in-part of application No. 10/535,106, filed as application No. PCT/EP03/12261 on Nov. 3, 2003, now Pat. No. 7,852,411.

(51) Int. Cl.
  G11B 27/19 (2006.01)
  H04N 21/81 (2011.01)
  H04N 21/431 (2011.01)
  H04N 21/488 (2011.01)

(52) U.S. Cl.
  CPC ..... *H04N 21/4312* (2013.01); *H04N 21/4884* (2013.01); *H04N 21/8126* (2013.01)

(58) Field of Classification Search
  USPC ......... 386/240, 244; 345/537, 629; 348/461; 725/32, 137
  See application file for complete search history.

(56) References Cited

U.S. PATENT DOCUMENTS

| | | | |
|---|---|---|---|
| 4,853,784 A | 8/1989 | Abt et al. | |
| 4,876,600 A | 10/1989 | Pietzsch et al. | |
| 4,961,153 A | 10/1990 | Fredrickson et al. | |
| 5,214,512 A | 5/1993 | Freeman | |
| 5,260,695 A | 11/1993 | Gengler et al. | |
| 5,351,067 A | 9/1994 | Lumelsky et al. | |
| 5,524,197 A | 6/1996 | Uya et al. | |
| 5,530,797 A | 6/1996 | Uya et al. | |
| 5,715,356 A | 2/1998 | Hirayama et al. | |
| 5,742,352 A * | 4/1998 | Tsukagoshi | H04N 5/4401 348/461 |
| 5,758,007 A * | 5/1998 | Kitamura | G11B 27/034 348/E11.006 |
| 5,930,450 A * | 7/1999 | Fujita | G09B 5/065 386/241 |
| 6,115,077 A | 9/2000 | Tsukagoshi | |
| 6,160,952 A * | 12/2000 | Mimura | H04N 21/8455 348/E5.099 |
| 6,249,640 B1 * | 6/2001 | Takiguchi | H04N 9/8227 386/200 |
| 6,275,267 B1 | 8/2001 | Kobayashi | |
| 6,415,437 B1 | 7/2002 | Ludvig et al. | |
| 6,424,792 B1 * | 7/2002 | Tsukagoshi | G11B 27/005 386/243 |
| 6,466,220 B1 * | 10/2002 | Cesana | G06T 1/20 345/537 |
| 6,493,036 B1 * | 12/2002 | Fernandez | G09G 5/14 348/561 |
| 6,661,427 B1 * | 12/2003 | MacInnis | G06T 9/00 345/660 |
| 6,680,448 B2 | 1/2004 | Kawashima et al. | |
| 6,741,794 B1 * | 5/2004 | Sumioka | H04N 5/073 348/E5.014 |
| 6,771,319 B2 * | 8/2004 | Konuma | H04N 3/32 348/584 |
| 6,775,467 B1 * | 8/2004 | Su | G11B 27/105 348/E5.101 |
| 6,859,236 B2 * | 2/2005 | Yui | G09G 5/14 345/629 |
| 6,888,577 B2 * | 5/2005 | Waki | G09G 5/14 348/584 |
| 7,062,153 B2 * | 6/2006 | Suda | H04N 5/445 348/E5.099 |
| 7,068,324 B2 * | 6/2006 | Englert | H04N 5/4401 348/564 |
| 7,623,140 B1 * | 11/2009 | Yeh | G06T 15/503 345/522 |
| 7,676,142 B1 * | 3/2010 | Hung | G11B 27/005 348/446 |
| 7,852,411 B2 | 12/2010 | Adolph et al. | |
| 8,737,810 B2 * | 5/2014 | Gandolph | H04N 5/278 386/244 |
| 2001/0017886 A1 * | 8/2001 | Webb | H04N 19/159 375/240.03 |
| 2002/0063681 A1 * | 5/2002 | Lan | G06T 11/60 345/156 |
| 2002/0075403 A1 * | 6/2002 | Barone, Jr. | H04N 5/44513 348/461 |
| 2002/0122136 A1 * | 9/2002 | Safadi | H04N 5/445 348/465 |
| 2002/0196369 A1 * | 12/2002 | Rieder | G09G 5/00 348/584 |
| 2003/0194207 A1 * | 10/2003 | Chung | G06F 17/30056 386/241 |
| 2003/0237091 A1 | 12/2003 | Toyama et al. | |
| 2006/0013563 A1 * | 1/2006 | Adolph | H04N 5/278 386/240 |
| 2006/0153532 A1 * | 7/2006 | McCrossan | G11B 27/10 386/230 |
| 2006/0204092 A1 * | 9/2006 | Hamasaka | G11B 27/11 382/173 |
| 2007/0280641 A1 * | 12/2007 | Uchimura | G11B 27/034 386/230 |
| 2008/0187286 A1 * | 8/2008 | Chung | H04N 9/8233 386/254 |
| 2011/0044662 A1 * | 2/2011 | Gandolph | H04N 5/278 386/285 |
| 2011/0150421 A1 * | 6/2011 | Sasaki | G11B 27/3027 386/241 |
| 2013/0250058 A1 * | 9/2013 | De Haan | H04N 13/0022 348/43 |
| 2015/0255120 A1 * | 9/2015 | Gandolph | G11B 27/036 386/244 |
| 2015/0255121 A1 * | 9/2015 | Gandolph | G11B 27/10 386/241 |

FOREIGN PATENT DOCUMENTS

| | | | |
|---|---|---|---|
| JP | 5037873 A2 * | 2/1993 | |
| JP | 7226920 A2 * | 8/1995 | |
| JP | 7250279 A2 * | 9/1995 | |
| JP | 8234775 * | 9/1996 | |
| JP | 8317301 * | 11/1996 | |
| JP | 9051489 | 2/1997 | |
| JP | 9051502 * | 2/1997 | |
| JP | 9284708 * | 10/1997 | |
| JP | 108129 * | 4/1998 | |
| JP | 10091172 * | 4/1998 | |
| JP | 63175583 * | 7/1998 | |
| JP | 2002216585 A2 * | 8/2002 | |
| JP | 2004064206 A2 * | 2/2004 | |
| JP | 200291409 * | 3/2007 | |

OTHER PUBLICATIONS

Brett et al. "Video Processing for Single-Chip DVB Decoder", IEEE Transactions on Consumer Electronics, vol. 47, No. 3, Aug. 2001, pp. 385-393.*

Haitsma et al. "A Watermarking scheme for digital camera", Philips Research, The Netherlands, Jan. 1, 2001, IEEE, pp. 487-489.*

(56) References Cited

OTHER PUBLICATIONS

ETSI_ETS300743—Digital Video Broadcasring (DVB)—Subtitling system, pp. 1-45, Sep. 1997.

* cited by examiner

| | | |
|---|---|---|
| 0x10 | page composition segment | defined in 7.2.1 |
| 0x11 | region composition segment | defined in 7.2.2 |
| 0x12 | CLUT definition segment | defined in 7.2.3 |
| 0x13 | object data segment | defined in 7.2.4 |
| 0x14 | enhanced page composition segment | defined here |
| 0x15 | enhanced region composition segment | defined here |
| 0x40 – 0x7F | reserved for future use | |
| 0x80 | end of display set segment | defined in 7.2.5 |
| 0x81 – 0xEF | private data | |
| 0xFF | stuffing | |
| All other values | reserved for future use | |

Fig. 1

Fig. 2

| Line | Syntax | Size | Type |
|---|---|---|---|
| 1 | region_composition_segment () { | | |
| 2 | sync_byte | 8 | bslbf |
| 3 | segment_type | 8 | bslbf |
| 4 | page_id | 16 | bslbf |
| 5 | segment_length | 16 | uimsbf |
| 6 | region_id | 8 | bslbf |
| 7 | region_version_number | 4 | bslbf |
| 8 | region_fill_flag | 1 | bslbf |
| 9 | reserved | 3 | bslbf |
| 10 | region_width | 16 | uimsbf |
| 11 | region_height | 16 | uimsbf |
| 12 | region_level_of_compatibility | 3 | bslbf |
| 13 | region_depth | 3 | bslbf |
| 14 | reserved | 2 | bslbf |
| 15 | CLUT_id | 8 | bslbf |
| 16 | sub_CLUT_id | 8 | bslbf |
| 17 | region_8-bit_pixel-code | 8 | bslbf |
| 18 | region_4-bit_pixel-code | 4 | bslbf |
| 19 | region_2-bit_pixel-code | 2 | bslbf |
| 20 | reserved | 2 | bslbf |
| 21 | while ( processed_length < segment_length ) { | | |
| 22 | region_id | 8 | bslbf |
| 23 | [...] | | |
| 24 | } | | |
| 25 | } | | |

Fig. 3

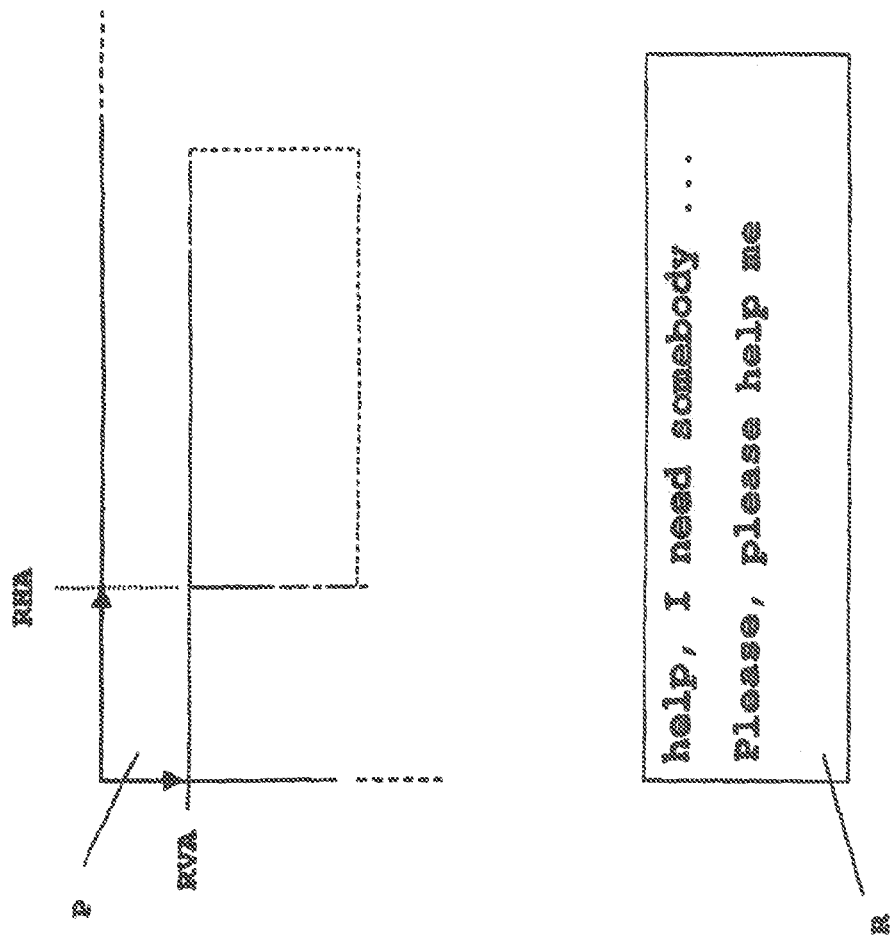

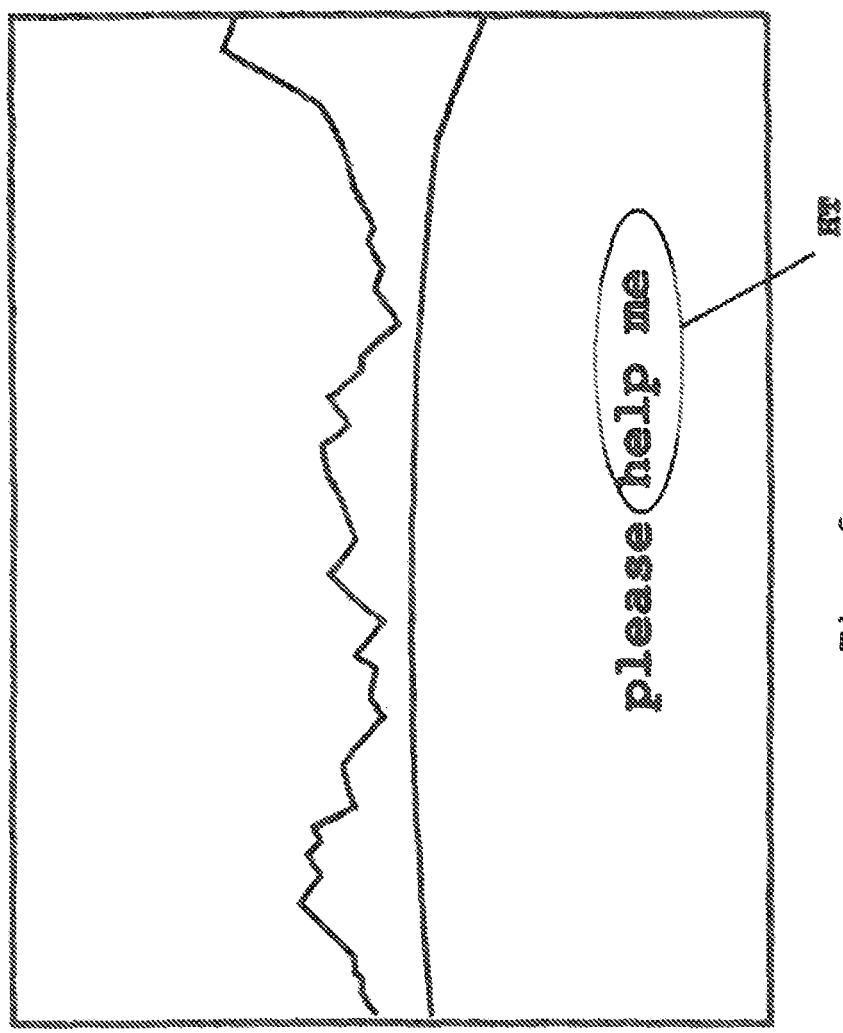

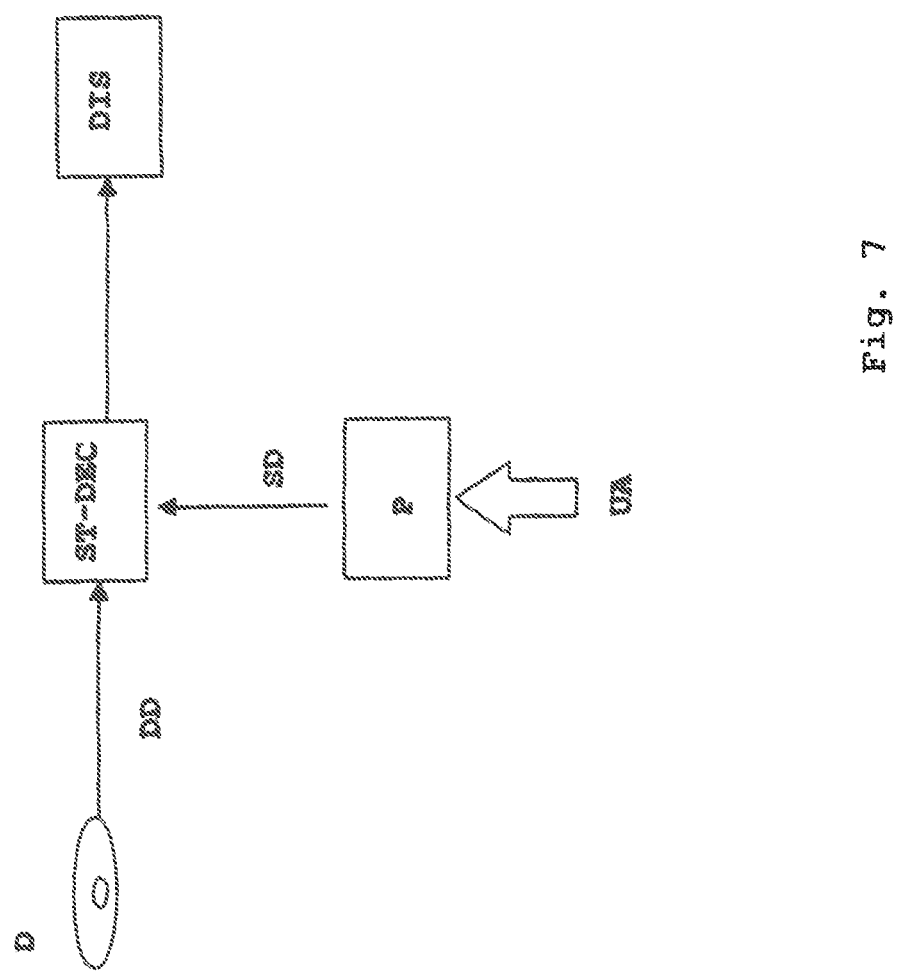

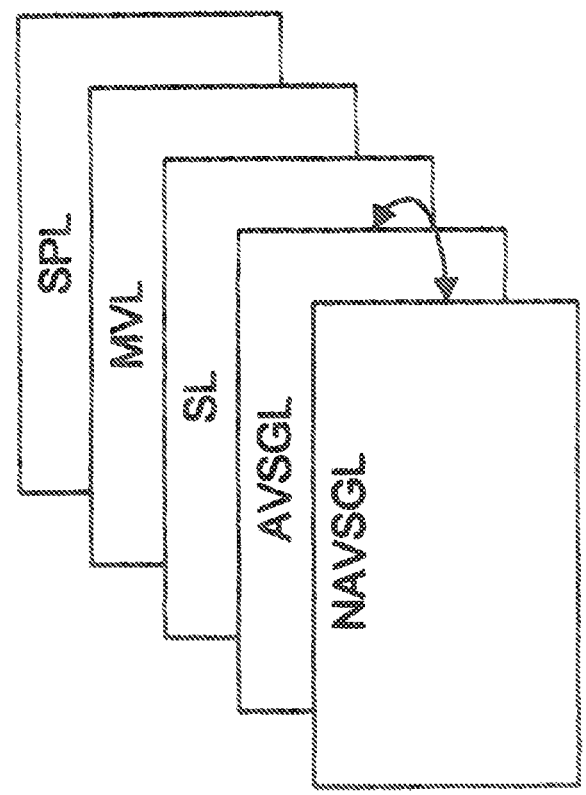

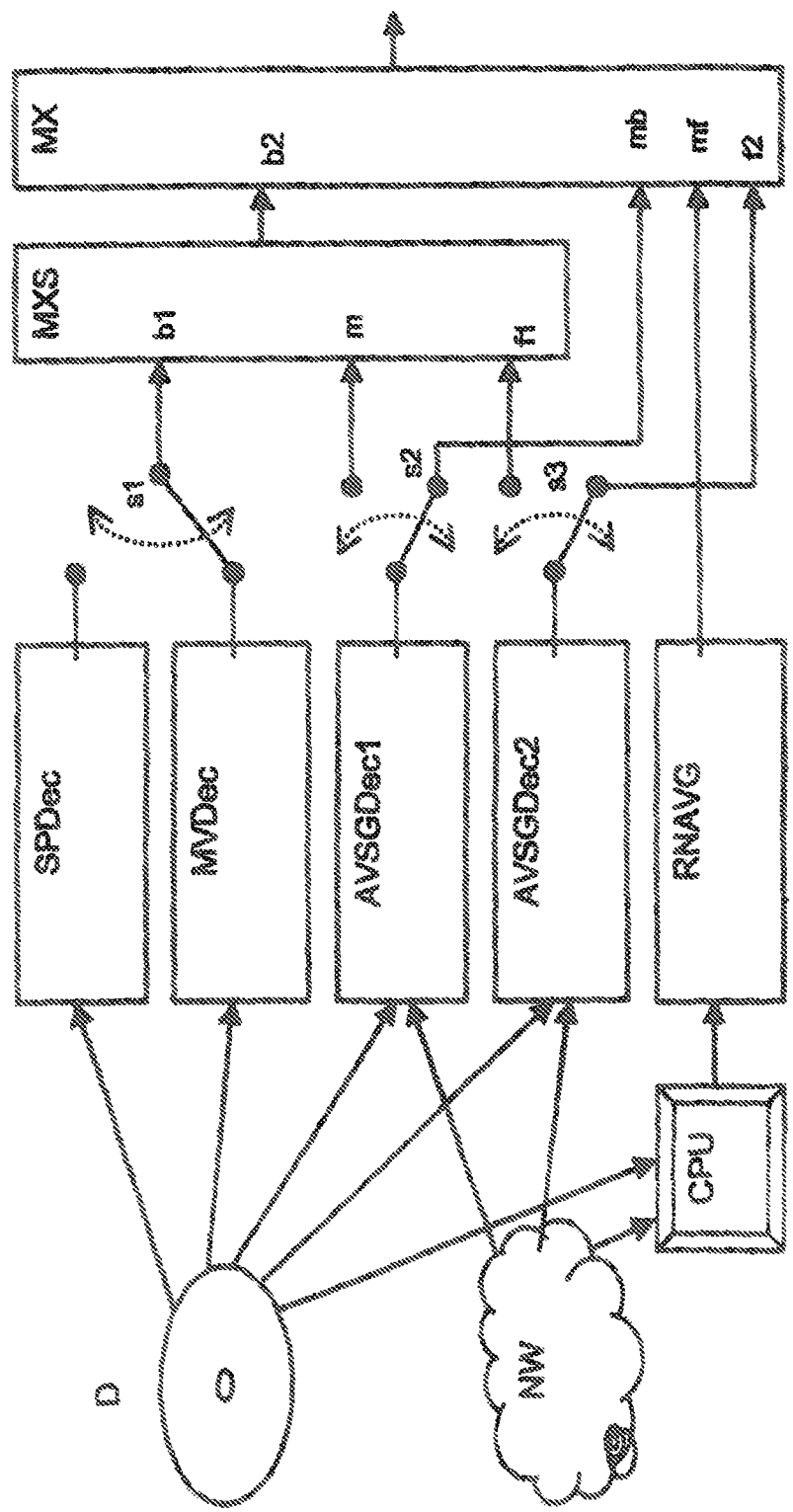

METHOD AND APPARATUS FOR COMPOSITION OF SUBTITLES

This application is a Continuation of co-pending U.S. application Ser. No. 12/800,418, herein incorporated by reference in its entirety, which is a Continuation-In-Part of U.S. application Ser. No. 10/535,106, filed May 16, 2005, herein incorporated by reference in its entirety.

CROSS RELATED APPLICATIONS

This application claims benefit of U.S. application Ser. No. 12/800,418, filed May 14, 2010, which claims the benefit, under 35 U.S.C. §365 of International Application PCT/EP03/12261, filed Nov. 3, 2003, which was published in accordance with PCT Article 21(2) on Jun. 3, 2004 in English and which claims the benefit of European patent application No. 02025474.4, filed Nov. 15, 2002.

FIELD OF THE INVENTION

The invention relates to a method and to an apparatus for composition of subtitles for audio/video presentations, which can be used e.g. for HDTV subtitles in pre-recorded formats like the so-called Blue-ray Disc.

BACKGROUND OF THE INVENTION

The technique of subtitling for Audio-Visual (AV) material has been used beginning with the first celluloid cinema movies and further until the recent digital media appeared. The main target of subtitling has been the support of handicapped people or small ethnographic language groups. Therefore subtitling often aims at the presentation of text information even when having been encoded as graphic data like pixel maps. Therefore pre-produced AV material for broadcasting (Closed Caption, Teletext, DVB-Subtitle etc.) and movie discs (DVD Sub-Picture etc.) primarily are optimized for subtitles representing simple static textual information. However, progress in PC software development for presentation and animation of textual information induces a corresponding demand for possibilities and features within the digital subtitling technique used for pre-recording and broadcasting. Using straightforward approaches without any special precautions, these increased requirements for subtitling would consume a too big portion of the limited overall bandwidth. The conflicting requirements for a 'full feature' subtitle encompassing karaoke all through genuine animations are on one hand the coding efficiency and on the other hand the full control for any subtitle author.

For today's state of the art of digitally subtitling AV material with separate subtitling information two main approaches exist: Subtitling can be based on either pixel data or on character data. In both cases, subtitling schemes comprise a general framework, which for instance deals with the synchronization of subtitling elements along the AV time axis.

Character Data Based Subtitling:

In the character-based subtitling approach, e.g. in the teletext system ETS 300 706 of European analog or digital TV, strings are described by sequences of letter codes, e.g. ASCII or UNICODE, which intrinsically allows for a very efficient encoding. But from character strings alone, subtitling cannot be converted into a graphical representation to be overlaid over video. For this, the intended character set, font and some font parameters, most notably the font size, must either be coded explicitly within the subtitling bitstream or an implicit assumption must be made about them within a suitably defined subtitling context. Also, any subtitling in this approach is confined to what can be expressed with the letters and symbols of the specific font(s) in use. The DVB Subtitling specification ETS 300 743, in its mode of "character objects", constitutes another state-of-the-art example of character-based subtitling.

Pixel Data Based Subtitling:

In the pixel-based subtitling approach, subtitling frames are conveyed directly in the form of graphical representations by describing them as (typically rectangular) regions of pixel values on the AV screen. Whenever anything is meant to be visible in the subtitling plane superimposed onto video, its pixel values must be encoded and provided in the subtitling bitstream, together with appropriate synchronization info, and hence for the full feature animation of subtitles all pixel changed must be transported. Obviously, when removing any limitations inherent with full feature animations of teletext, the pixel-based approach carries the penalty of a considerably increased bandwidth for the subtitling data. Examples of pixel-based subtitling schemes can be found in DVD's sub-picture concept "DVD Specification for Read-Only disc", Part 3: Video, as well as in the "pixel object" concept of DVB Subtitling, specified in ETS 300 743.

SUMMARY OF THE INVENTION

Embodiments of the invention include a subtitling format encompassing elements of enhanced syntax and semantic to provide improved animation capabilities. The disclosed embodiments improve subtitle performance without stressing the available subtitle bitrate. This will become essential for authoring content of high-end HDTV subtitles in pre-recorded format, which can be broadcast or pressed on high capacity optical media, e.g. the Blue-ray Disc. The invention includes abilities for improved authoring possibilities for the content production to animate subtitles.

Introduced by the disclosure are elements of syntax and semantic describing the color change for parts of graphics to display. This can be used for highlight effects in applications like for example karaoke, avoiding the repeated transfer of pixel data.

Other disclosed elements of syntax and semantic facilitate the ability of cropping parts of the subtitles before displaying them. By using the technique of subsequently transferred cropping parameters for an object to display, a bit saving animation of subtitles becomes available. Such cropping parameter can be used for example to generate text changes by wiping boxes, blinds, scrolling, wipes, checker boxes, etc.

Furthermore the disclosed elements can be used to provide interactivity on textual and graphical information. Especially the positioning and/or color settings of subtitles can be manipulated based upon user request.

DRAWINGS

Exemplary embodiments of the invention are described with reference to the accompanying drawings and tables, which show:

FIG. 1: segment_type values for enhanced PCS and RCS;
FIG. 2: Enhanced page composition segment;
FIG. 3: Enhanced region composition segment;
FIG. 4: Example for the definition of a subtitle region and its location within a page;

FIG. 5: Example for definition of a region sub-GLUT and region cropping;

FIG. 6: Resulting display example;

FIG. 7: Interactive usage of subtitles;

FIG. 8: Video and Graphics Planes;

FIG. 9: Video and Graphics Mixing and Switching.

EXEMPLARY EMBODIMENTS OF THE INVENTION

The invention can preferably be embodied based on the syntax and semantic of the DVB subtitle specification (DVB-ST). To provide improved capabilities for the manipulation of graphic subtitle elements, the semantics of DVB-STs page composition segment (PCS) and region composition segment (RCS) are expanded.

DVB_ST uses page composition segments (PCS) to describe the positions of one or more rectangular regions on the display screen. The region composition segments (RCS) are used to define the size of any such rectangular area and identifies the color-lookup-table (GLUT) used within.

Embodiments of the proposed invention keeps backward compatibility with DVB-ST by using different segment_types for the enhanced PCS and RCS elements, as listed in FIG. 1 showing segment type values according to DVB-ST, with additional values for enhanced PCS and enhanced RCS. It would also be possible to choose other values instead. Another approach for keeping backward compatibility would be to keep the existing segment_types and increase the version_number of the specification, e.g. by incrementing the subtitle_stream_id in the PES_data_field structure.

FIG. 2. shows the data structure of an enhanced page composition segment (PCS), containing a region_cropping section and a region_sub_CLUT section. FIG. 3 shows the data structure of an enhanced region composition segment (RCS), containing an identifier sub_CLUT_id for a sub-color-look-up-table. With respect to original DVB-ST, all structures shown are expanded. In the tables the additional entries are lines 15-28 in FIG. 2 and line 16 in FIG. 3.

The enhanced PCS shown in FIG. 2 carries optional information about the region cropping and optional information about the region_sub-CLUT for every region listed. The two values of region_cropping and region_sub_CLUT indicate if such optional information is available for the current region in process. Therefore cropping and sub-GLUT may be defined separately for every region. While region_cropping is used as a flag, as indicated by "if region cropping==0x01", the region_sub_CLUT shows the value how many sub-CLUT positions are described. This is done to provide different alternatives within the stream. Alternative sub-GLUT positions can be used to define different menu button positions for the display screen. Only one of them—the first one as a default—is active and the user can change the position to navigate through the different pre-defined positions pressing the remote for example.

The enhanced RCS shown in FIG. 3 carries the sub_CLUT_id identifying the family of CLUTs that applies to this region. This is done to re-use CLUTs for different regions and different region sub_CLUTs as well.

The enhanced PCS and enhanced RCS elements provide the ability that subtitles can be manipulated independent from the encoding method i.e. independent from whether they are encoded as character data or pixel data.

The enhanced PCS and RCS can be used to perform many different animation effects for subtitles. Those could be wiping boxes, blinds, scrolling, wipes, checker boxes, etc.

The following figures show an application example for karaoke. FIG. 4 shows the definition of a region R containing lyrics of a song displayed for karaoke. The letters of the subtitle may be encoded as pixel data or as character data as well. The region_vertical_address RVA and the region_horizontal_address RHA define the location of the subtitle within the frame, or page PG, to display.

FIG. 5 depicts in the upper part region cropping, and in the lower part the location of the region sub-GLUT. Region cropping defines which part of the region is effectively displayed. This is achieved by four parameters RHG,RVC, RGH,RCW indicating the start coordinates and the size of the fragment to display. Region_horizontal_cropping RHC specifies the horizontal address of the top left pixel of this cropping, region_vertical_cropping RVC specifies the vertical address of the top line of this cropping, region_cropping_width RCW specifies the horizontal length of this cropping, and region_cropping_height RCH specifies the vertical length of this cropping, wherein cropping means that part of the subtitles that is visible on a display.

The region sub-CLUT location shown in the lower part of FIG. 5 defines which part of the region has to be displayed using a color-look-up-table (GLUT) different from the region GLUT. This is achieved by four parameters SCHA, SCVA,SCH,SCW indicating the start coordinates and the size of the sub-region used by the sub-CLUT. All coordinate parameters are to be understood relative to the region the sub-CLUT belongs to. sub_CLUT_horizontal_address SCHA specifies the horizontal address of the top left pixel of this sub-CLUT, sub_CLUT_vertical_address SCVA specifies the vertical address of the top line of this sub-CWT, sub_CLUT_width SCW specifies the horizontal length of this sub-GLUT and sub_CLUT_height SCH specifies the vertical length of this sub-CLUT.

Picking up all parameters defined with the previous figures results in the displayed subtitle as depicted in FIG. 6. The subtitle is not depicted in whole on the display but only the cropped part of it. Furthermore the sub-GLUT was used to provide a highlight HT, so that the user knows what to sing in the moment.

As the enhanced PCS are sent within MPEG packet elementary stream (PES) packets labeled by presentation time stamps (PTS), any effect can be synchronized to the AV.

Another idea of the invention is the superseding of subtitle animation parameters by the user. This offers a way to realize interactive subtitles. The enhanced PCS parameters are transferred as a default, and the user may change them via a remote control for example. Thus the user is able to move, crop or highlight the subtitle.

This could be an advantage for a user defined repositioning of a subtitling text, so that the user can subjectively minimize the annoyance by the subtitle text placement on top of the motion video. Also the color of the subtitles could be set according to users preferences. FIG. 7 shows a block diagram for interactive subtitle modifications. The default parameters DD read from a disc D are superseded by superseding data SD being generated upon the user action UA and processed by a processor P.

Another application for overriding subtitle animation parameters like position, cropping rectangle, CLUTs and sub-CLUTs is the realization of some very basic sort of interactive gaming. The subtitle may carry pixel data of an animated character. This character is subsequently moved on the display screen driven by either user interaction, programmatic control or both.

The overriding of subtitle animation parameters can be implemented in at least two ways. The first option is that the overriding parameters SD replace the parameters DD send in the bitstream. The second option is that the overriding parameters SD are used as an offset that is added to or subtracted from the subtitle animation parameters DD send in the bitstream.

The enhanced PCS and RCS provide a lot more of animation capabilities not explained. Following is a non-exhaustive list of examples: wiping boxes, blinds, scrolling, wipes, checker boxes in details.

Exemplary video and graphics planes are shown in FIG. 8 in an exemplary, schematic manner. A background is provided by either an MPEG-2 video layer MVL or a still picture layer SPL. They are mutually exclusive, which means that not both of them need to be held in a buffer at a time. The next two layers comprise a subtitle layer SL and an AV sync type graphics layer AVSGL. These two layers are in this example interchangeable, meaning that either the subtitle layer SL or the AV sync type graphics layer AVSGL may have priority over the other. The front layer is a non-AV sync graphics layer NAVSGL, containing graphics that need not be synchronized with the AV content, such as e.g. menus or other on-screen displays. The inventive method can preferably be used for the subtitle layer SL, the AV sync graphics layer AVSGL and/or the Non-AV sync graphics layer NAVSGL.

FIG. 9 shows relevant components of an apparatus for video and graphics mixing and switching. Data comprising either still picture data or MPEG-2 video data, further data for subtitles, data for animations and data for non-AV sync graphics such as menu buttons, are retrieved from a disc D. Additionally or alternatively, data for subtitles, animations and/or non-AV sync graphics can be received from a network NW, e.g. Internet. A processing unit CPU processes the non-AV sync graphics data and sends the resulting data to a rendering device for non-AV sync graphics RNAVG.

The apparatus contains a still picture decoder SPDec and an MPEG-2 video decoder MVDec, but since only one of them is used at a time, a switch 51 can select which data shall be used for further processing. Moreover, two identical decoders AVSGDec1,AVSGDec2 are used for decoding subtitle and animation data. The outputs of these two decoders AVSGDec1, AVSGDec2 may be switched by independent switches s2,s3 to either a mixer MX, or for preprocessing to a mixer and scaler MXS, which outputs its resulting data to said mixer MX. These two units MX,MXS are used to perform the superimposing of its various input data, thus controlling the display order of the layers. The mixer MX has inputs for a front layer f2, a middle front layer mf, a middle back layer mb and a background layer b2. The front layer f2 may be unused, if the corresponding switch s3 is in a position to connect the second AV sync graphics decoder AVSGDec2 to the mixer and scaler MXS. This unit MXS has inputs for front layer f1, middle layer m and background layer b. It superimposes these data correspondingly and sends the resulting picture data to the background input b2 of the mixer MX. Thus, these data represent e.g. a frame comprising up to three layers of picture and subtitles, which can be scaled and moved together within the final picture. The background input b1 of the mixer and scaler MXS is connected to the switch s1 mentioned above, so that the background can be generated from a still picture or an MPEG-2 video.

The output of the first AV sync graphics decoder AVSGDec1 is connected to a second switch s2, which may switch it to the middle layer input m of the mixer and scaler MXS or to the middle back layer input mb of the mixer MX. The output of the second AV sync graphics decoder AVSGDec2 is connected to a third switch s3, which may switch it to the front layer input f1 of the mixer and scaler MXS or to the middle front layer input mf of the mixer MX.

Depending on the positions of the second and third switch s2,s3, either the output of the first or the second AV sync graphics decoder AVSGDec1,AVSGD2 may have priority over the other, as described above. For having the data from the first decoder AVSGDec1 in the foreground, the second switch s2 may route the subtitle data to the middle back input mb of the mixer MX, while the third switch s3 routes the animation graphics data to the front input f1 of the mixer and scaler MXS, so that it ends up at the background input b2 of the mixer MX. Otherwise, for having the data from the second decoder AVSGDec2 in the foreground, the switches s2,s3 may route their outputs to the same unit, either the mixer and scaler MXS or the mixer MX, as shown in FIG. 9.

The invention claimed is:

1. Apparatus for composition of subtitles for audio/video presentations, wherein data streams containing video, audio and subtitle information are transferred from a storage medium, the apparatus comprising:

a processor for retrieving from said storage medium subtitle layer data, wherein the subtitle layer data contain graphic subtitle elements, and presentation time stamps;

the processor extracting from said retrieved subtitle layer data subtitle display region information for defining a subtitle display region, and subtitle display region cropping information, for cropping the display region, the subtitle display region cropping information comprising a parameter for horizontal position of the cropped subtitle display region, a parameter for vertical position of the cropped subtitle display region, a parameter for width of the cropped subtitle display region, and a parameter for height of the cropped subtitle display region; and a renderer for enabling automatic cropping of rectangular parts of the subtitle elements to be displayed in the cropped subtitle display region;

wherein the cropped parts of the subtitle elements to be displayed are defined by said subtitle display region cropping information; and wherein the presentation time stamps are suitable for synchronizing the cropped parts of the subtitle elements to the video presentation.

* * * * *